Patented Mar. 28, 1939

2,151,967

UNITED STATES PATENT OFFICE 2,151,967

FLESH FOODS AND THE PRESERVATION THEREOF

Carl A. Hedreen, Seattle, Wash., and Harry R. Beard, Vancouver, British Columbia, Canada, assignors to New England Fish Company, Seattle, Wash., a corporation of Maine No Drawing. Application June 11, 1934, Serial No. 730,150

11 Claims. (Cl. 99—195)

This invention relates to flesh food articles and the preservation thereof; and is particularly concerned with a novel type of treated article and with new and beneficial methods and materials for treating and preserving perishable articles of food, to produce such improved article.

In general, the invention contemplates improvements in the freezing, handling, storage, and shipment of perishable foodstuffs or comestibles; improvements in the treating, preserving, or coating materials utilized in such methods or processes; and improvements in frozen and/or cold storage foodstuffs produced by such methods.

While the invention is of general adaptability in this field, it is especially adaptable and useful to the preservation of fish or other seafoods, and the like, which are very susceptible to damage, rapid deterioration, impairment of quality, flavor, appearance, and resultant reduction in marketability. Similarly, although certain aspects of the invention are of general utility in connection with the various steps of freezing, handling, and storing, of foodstuffs (as above set forth), the invention is in general of peculiar importance and advantage in connection with the coating or glazing of fish, and the like, at an intermediate stage between the steps of freezing and storing the fish. Therefore, the method of the invention will be hereinafter described, for the most part, with reference to its utilization as an intermediate step of a fish freezing process proper and a subsequent storing of the frozen fish.

More specifically, this invention relates especially to improvements in glazes, or similar coatings, for foodstuffs, improved glazing solutions, improved methods of carrying out the glazing, and improved articles finally produced. The objects, nature, advantages, and practice, of the invention will be more clearly understood after a brief discussion of certain prior art practices.

In the known art of freezing, treating and preserving fish and other foodstuffs, various methods have heretofore been employed, such as: maintaining circulation of cold gaseous media about the articles; freezing and/or keeping the articles in chilled containers; immersing the articles in refrigerating liquids; or various combinations of the foregoing, etc.; some of these prior practices, with certain of their known difficulties, being set forth somewhat more fully in a brief analysis of the prior art appearing in the preliminary part of the specification of Harry R. Beard's United States application No. 354,445, filed April 11, 1929, which issued on June 26, 1934, as Patent No. 1,963,965 (and in the corresponding Beard Canadian Patent No. 329,213, issued January 10, 1933).

Another practice now known in the art, involving the freezing and storing of foodstuffs (but particularly useful in freezing thereof) is disclosed and claimed in the aforesaid case of H. R. Beard which embodies certain improvements over the earlier art. Briefly, that case involves the treatment of fish and the like by an extremely high-speed current of some refrigerated gaseous medium, with certain humidifying and other features, in order to minimize autolysis or self-digestion, and other impairment of the goods or objects being treated.

Still another practice now known in the art is disclosed and claimed in H. R. Beard's United States application 354,446, filed April 11, 1929, which issued on August 14, 1934, as Patent No. 1,969,832 (and in a corresponding Canadian Patent No. 329,214, granted January 10, 1933) which may be briefly described as involving the application of a water-ice glaze to the articles, during the freezing process proper, to minimize desiccation, and the like.

Further developments of the art, both with regard to freezing, and glazing, for storage, are disclosed and claimed in H. R. Beard's United States application No. 426,206, filed February 6, 1930, which issued on August 14, 1934, as Patent No. 1,969,833 (and in a corresponding Canadian Patent No. 332,293, issued May 9, 1933), and involve, briefly, a continuous system for freezing, glazing, and handling foodstuffs, an apparatus being therein disclosed which is capable of use in connection with some of the practices hereinbefore mentioned.

While the details of such prior developments need not be set forth here, since reference may be made to descriptive matter contained in the aforementioned patents, it should now be pointed out that the present invention fundamentally contemplates substantial improvement in the glazing solutions and methods, the glaze produced, and the resultant treated and stored article, as compared with the results effected by such prior methods either when employed singly or in various combinations; and the present invention is especially useful when employed immediately following the aforesaid Beard freezing processes, or other known freezing methods.

A major difficulty heretofore encountered, especially immediately following the freezing proper, and prior to sending the articles out for shipment, or into cold storage, has been the cracking, chipping, or general damaging of the finished glaze, especially immediately following a very low temperature freezing process.

Whether the fish have been frozen without a glaze, by any of the known methods, and then glazed for storage or shipment; or whether they have been glazed as a part of the freezing process proper; if they are taken from the freezer at a temperature of around 0° F. or lower, and then glazed, or reglazed, for storage or shipment, severe cracking, chipping and/or other damaging of the glaze frequently occurs. To obtain an excellent, impervious and thick, ice-glaze over the entire surface of each article, immediately after freezing and just prior to placing the article in storage, has been a peculiarly difficult problem, of a double-headed nature, for, on the one hand, the lower the temperature of the fish when dipped in the glazing water the worse has been the cracking of the glaze immediately upon removal of the fish from the water, while, on the other hand, the higher the temperature of the fish when dipped in the water, the thinner has been the resultant glaze, which also takes more time to form, under those conditions. This has been the crux of the difficulty, in applying glazing to foodstuffs, after freezing, preliminary to placing them in cold storage.

To elaborate a little on the foregoing, if fish are taken from a sharp freezer at −5° F. or lower, or from some freezing system such as described in the above-mentioned patents at perhaps minus 30°, minus 40° or even minus 50°, and then contacted with water at about plus 34° F., as by spraying or dipping them in a bath of water, the glaze or coating of ice frequently cracks or chips badly, shortly after removal from the glazing bath, and in some instances pieces of the ice film may actually break loose from the surface and leave a patchy glaze, and thus perhaps necessitate a reglazing. The importance of a heavy, impervious glaze can hardly be over-emphasized, since such a coating (especially as applied just prior to storage or shipment) is intended to protect the surface tissues of the fish from loss of water by evaporative processes and thus to prevent them from taking on a shrunken and whitened appearance; to avoid oxidation changes, such as darkening and discoloration of blood, yellowing of flesh and skin, and rusting of, and development of rancidity in, oils and fats of the fish, due to the atmosphere being in direct contact with the tissues.

As long as the glaze lasts, excellent protection is afforded, even during many months of storage, because the fish tissues themselves cannot lose water until after the glaze has evaporated, nor can the oxygen of the air come into direct contact with the fish. Upon damage to the glaze, or evaporative loss of the glaze if it is too thin (which necessitates reglazing during the storage period), drying and oxidative changes take place and the surfaces of the articles become damaged to such an extent that they must be trimmed off. If the damage is slight, there is a partial loss not only in weight but in grade; and if the damage is extensive a total loss may result, and the monetary losses due to these undesirable changes are very large. It is an expensive procedure to remove the fish from the storage piles or racks, at suitable intervals, to reglaze them, and even in the best managed cold storage plants this is not apt to be done as frequently as is really desirable.

Another point of importance which should not be overlooked is the desirability of having a glaze which is not only free from cracks and blemishes but also clearly transparent, and preferably colorless, not only to make the product appear at its best, but to enable a critical inspection of the fish itself to be made. Buyers judge quality of frozen fish by the color of the cut surfaces, color of skin, quantity of scales on the fish, presence of yellowing, fading, and other undesirable visible signs; and it will readily be seen that the presence of many cracks in the glaze prevents careful inspection and detracts from the general appearance of the product in much the same manner as a cracked show window interferes with inspection of goods on display.

To place a plain water-ice-glaze on frozen fish, just prior to putting them in storage it has been general practice, where fish have been frozen at extremely low temperatures (such as minus 5° F. to minus 45° F.) to take the fish and pile them in the glazing room, where the temperature is considerably higher (usually plus 10° F. to around 20° F. or more) and to let the temperature of the fish rise, substantially throughout, up to approximately the temperature of the glazing room, before they are dipped in the bath. This has to a considerable extent minimized the cracking of the glaze immediately after the dipping and prior to storage; but not only does such a procedure necessitate extensive extra handling, with bruising and breaking of tails and fins of the fish, but a considerably thinner glaze has thereby been obtained than would have resulted had the fish been glazed while they were at their lower temperature, immediately upon leaving the freezer; so that repeated glazings during storage have been necessary, heretofore.

In addition, when fish are at substantially the temperature of the glazing room, when glazed, softening of the thin portions (such as the belly walls of headed and gutted fish) takes place by the time a good coating is applied to the thicker portions; and such softened parts bend when the fish are being handled immediately after the glazing process, with consequent peeling of the glaze, which is often as detrimental as the cracking which results when the fish are glazed at very low temperatures. On the other hand, when the fish are taken immediately from the freezer, at very low temperature, and glazed before they come up materially from that temperature, there is a great difference in the thickness of the glaze obtained on different portions of the fish, with resultant irregular evaporation of the glaze during storage, in addition to the undesirable cracking heretofore discussed.

The present invention, in overcoming the foregoing difficulties, involves specifically a glazing bath having a slightly lower freezing point than plain water, which comprises a solution, consisting of one or more substances, dissolved in water, harmless from a food standpoint and which do not react with the fish in such a way as to cause any undesirable change, and preferably also of such a nature as to give a relatively clear glaze of a somewhat flexible or yielding character as compared with a plain ice-glaze. It has been found that a wide variety of substances, and thus of solutions, for the glazing bath, may be employed, and that a very excellent, clear, thick, relatively non-peeling and non-cracking glaze, of a more uniform nature may be obtained even though the fish, when placed in the bath, are at an extremely low temperature, such, for example, as minus 45° F. The nature of the film thus formed, and the theory back of it, so far as at present understood, will be further discussed herein, after some consideration of the practice of the invention.

For the purposes of the invention it has been found possible to employ, in the glazing bath, any of a numerous variety of chemicals, and of chemical compounds, (organic and inorganic), including, for example, elements, compounds or derivatives, in one form or another, of a variety of types, such as: chlorides; sulphates; carbonates; phosphates; these combined with sodium or other positive radicals; carbohydrates; et cetera.

As specific examples, of some of the foregoing which have been tested and found suitable, may be mentioned the following sugars and salts, most of which are readily and cheaply available:

Sucrose (cane, beet or other ordinary sugars), dextrose (glucose and the like), sodium chloride, sodium carbonate, sodium acid carbonate, di-sodium phosphate, tri-sodium phosphate, sodium acid phosphate, and sodium sulphate.

A moderate amount of one or more other elements and/or impurities, present in the prepared solution, so long as they be not of a harmful nature, does not appear to be materially detrimental to the ultimate glaze.

Sucrose and sodium chloride, particularly the latter, have been found to be especially good, in giving a clear, tough, yieldable, non-cracking glaze, at low cost.

The concentration of the substances dissolved in the glazing water depends primarily upon the temperature of the fish which are to be glazed, the colder the fish the greater the concentration; but in any event the concentration need not be very high, and with fish at usual temperatures in the sub-zero range, as they leave the freezer, the concentration of the material added to the glazing water probably need not, even in extreme cases, be more than around 1 or 2%. In fact, it has been found that, with the average temperature of frozen fish, the best concentration is between $\frac{1}{10}$ of 1% and $\frac{1}{2}$ of 1%, and preferably about $\frac{1}{8}$ of 1% to about $\frac{1}{3}$ of 1%, by weight, of the particular material chosen to be added to the water. It seems to be desirable not to give a heavier concentration than necessary to prevent cracking of the glaze, as otherwise the glaze may become somewhat mushy, under shipping conditions, where the fish warm up to about 20° to 30° F.

A very convenient way of practicing the invention might now be explained, as follows:

The fish are first frozen, by any of the known methods (a few of which are briefly indicated hereinabove) for example by a high-speed low-temperature current of some gaseous medium, such as air, carbon dioxide gas, or other substance which is harmless to the fish. The latter method is in accordance with the first of the Beard applications above mentioned, and attains a high quality in the frozen fish itself. Ordinary sharp freezers are also satisfactory.

During the freezing proper, particularly at an early stage thereof (and successively at different stages, if desired) any desired known protection may be afforded to the fish as against desiccation by the freezing medium. In some cases it is preferable to employ a glaze, which may be of the type involved in the present invention, or desirably of the plain water-ice type applied as described in the second of the said Beard applications.

Preferably also, the fish are handled through the freezing process and delivered into storage, or for refrigerated shipment, by a continuous apparatus and process, for example, such as disclosed in the third-mentioned Beard application, in which the fish are loaded onto endless conveyors, transported into a cold air stream freezing tunnel, moved into a glazing chamber for dipping or spraying with water, moved back into the freezing tunnel where sufficient traverse is made to complete the freezing, moved out of the freezing tunnel to a point where the conveyor may be slightly warmed for ease of removal of the fish, and finally, unloaded from the conveyor system and transported into storage.

By such an arrangement of method and apparatus, the fish normally come from the freezer at very low temperatures, for example, minus 20° F. or minus 30° F., although the range may extend to a few degrees above zero, or in the other direction down to minus 50° F. or lower. The fish come from such a freezing system in very excellent condition, and in accordance with present practice are usually then placed in cold storage at around $+10°$ to $+20°$ F. or higher, although this storage range may also extend downwardly to around 0° F. or a few degrees lower.

Intermediate the freezing and placing of the fish in storage, the present invention contemplates dipping the fish in a glazing solution or bath, of the nature hereinbefore specified, before the fish have lost their reserve refrigeration, and preferably while they are still at a sub-zero temperature. The fish take up heat from the film of water in direct contact with them, until an encasement or film of substantially non-cracking glaze is formed on all the exposed surfaces. The thickening of this glaze ceases when the temperature of the surface layers of the fish approaches the freezing point of the solution, and the fish are then removed from the bath, so that the coating already formed does not commence to thaw.

The glazing bath may desirably be at about 34° F. and the colder the fish are when they are dipped in this bath the thicker will be the glaze on the surface. With certain articles of food which are readily wrapped or packed, the encasement may include any desired packaging, followed by the glazing.

By the above described method, particularly when employed in the specific series of steps just recited, all the advantages and desirable characteristics of the quickly frozen fish are retained, the fish need not be warmed up to the temperature of the glazing room (as was heretofore the usual practice in order to prevent cracking of the glaze), and upon moving them from the glazing into the storage stage there is little damage to the glaze due to handling of the fish, less handling is necessary, the frequency of repeated glazings during storage is reduced and in general the quality of the goods is maintained and at a lower cost than hertofore required.

Theoretically, the reasons for the necessity, heretofore, of warming up the fish prior to glazing for storage, where plain water was used as the glazing medium, appear to be as follows:

In the first place, if a very cold fish is dipped in the glazing bath the ice film formed seems to be more brittle because of the lower temperature. When such fish are first removed from such a plain water bath, no cracking takes place but in a few seconds to a few minutes afterwards the cracking does take place. Very probably there are expansions and contractions in the fish itself during the temperature changes that take place in it after it is removed from the glazing water, and the resultant changes in volume apparently induce the cracking of the brittle glaze, as does also the sudden cooling of the ice film from the under side next to the fish, which takes place very quickly after the fish are removed from the glazing water. The nature and rapidity of the cracking of the glaze, under such circumstances, seem similar to the cracking of hot glass when it is cooled suddenly.

With the improved glazing solution of the present invention, apparently the crystalline or other structure of the glaze is modified, as well as the chemical composition, in a way to produce a more flexible frozen film. Whatever be the theory, the fact is that the addition of what may be termed the "modifier", of the present invention, to the glazing bath produces a resultant glaze which is thick, tough, clear, and highly resistant to fracture, damage or cracking, either by impact or temperature change. If fish, when so glazed, are pounded together or thrown on the floor, only a small spot of pulverized ice forms, immediately at the point where the impact took place, and with no noticeable radial cracks.

Furthermore, the glaze of the present invention appears to be of very similar or identical composition to that of the solution itself, because the fish are at such a low temperature, and freezing takes place so rapidly, that separation of the modifier from the water does not occur.

What is claimed is:

1. As a new article, a frozen flesh food in an encasement comprising a tough, adherent, substantially air-tight ice-glaze coating having a lower freezing-point and substantially greater resistance to cracking, peeling and fracture than pure water-ice and formed of a frozen solution of water and an edible non-injurious solute characterized by its ability to so reduce the freezing-point and increase the toughness of the glaze.

2. As a new article, a frozen flesh food in an encasement comprising a tough, adherent, substantially air-tight ice-glaze coating having a lower freezing-point and substantially greater resistance to cracking, peeling and fracture than pure water-ice and formed of a frozen solution of water about 98% to 99.9% and the balance an edible non-injurious solute characterized by its ability to so reduce the freezing-point and increase the toughness of the glaze.

3. As a new article, a frozen flesh food in an encasement comprising a tough, adherent, substantially air-tight ice-glaze coating having a lower freezing-point and substantially greater resistance to cracking, peeling and fracture than pure water-ice and formed of a frozen solution of water about 98% to 99.9% and the balance an edible non-injurious solute characterized by its ability to so reduce the frezing-point and increase the toughness of the glaze, said solute consisting of at least one material of the following group: sucrose, dextrose, sodium chloride, sodium carbonate, sodium acid carbonate, di-sodium phosphate, tri-sodium phosphate, sodium acid phosphate and sodium sulphate.

4. In the preservation of flesh food articles involving freezing and subsequent refrigerated storage or shipment, the method which comprises refrigerating the articles to a temperature within the sub-zero range, and, before the aveage temperature of the articles can rise appreciably above 0° F., glazing the articles under the influence of their own refrigeration by subjecting them to an aqueous glazing bath of a higher temperature and incorporating, in solution, material from the class of edible water-soluble materials non-injurious to said articles and adapted to lower the freezing point of the solution, and regulating the concentration of the solution to maintain the solute therein in amounts at least .1% by weight when the articles being glazed have a temperature in the vicinity of 0° F. and at greater concentrations when the articles are at substantially lower temperatures, thereby rendering the resultant glaze tenacious and highly resistant to cracking and like damage, but limiting the maximum concentration to less than that which would produce mushiness of the glaze at normal cold storage or shipping temperatures above the original refrigerating temperature.

5. In the preservation of flesh food articles involving freezing and subsequent refrigerated storage or shipment, the method which comprises refrigerating the articles to a temperature within the sub-zero range, and, before the average temperature of the articles can rise appreciably above 0° F., glazing the articles under the influence of their own refrigeration, in such manner that the applied glaze is of substantially the same composition as the bath from which it was formed, by subjecting them to an aqueous glazing bath of a higher temperature and incorporating, in solution, material from the class of edible water-soluble materials non-injurious to said articles and adapted to lower the freezing point of the solution, and regulating the concentration of the solution to maintain the solute therein in amounts at least .1% by weight when the articles being glazed have a temperature in the vicinity of 0° F. and at greater concentrations when the articles are at substantially lower temperatures, thereby rendering the resultant glaze tenacious and highly resistant to cracking and like damage, but limiting the maximum concentration to less than that which would produce mushiness of the glaze at normal cold storage or shipping temperatures above the original refrigerating temperature.

6. In the preservation of flesh food articles involving freezing and subsequent refrigerated storage or shipment, the method which comprises refrigerating the articles to a temperature within the sub-zero range, and, before the average temperature of the articles can rise appreciably above 0° F., glazing the articles under the influence of their own refrigeration by subjecting them to an aqueous glazing bath of a higher temperature and incorporating, in solution, material from the class of edible water-soluble materials non-injurious to said articles and adapted to lower the freezing point of the solution, regulating the concentration of the solution to maintain the solute therein in amounts at least .1% by weight when the articles being glazed have a temperature in the vicinity of 0° F. and at greater concentrations when the articles are at substantially lower temperatures, thereby rendering the resultant glaze tenacious and highly resistant to cracking and like damage, but limiting the maximum concentration to less than that which would produce mushiness of the glaze at normal cold storage or shipping temperatures above the original refrigerating temperature, and completing the formation of the glaze on said articles with such rapidity that the glaze is of substantially the same composition as the solution from which it was formed.

7. In the preservation of flesh food articles, the method which comprises refrigerating the articles to a temperature within the sub-zero range, and thereafter, before the average temperature of the articles can rise appreciably above 0° F., contacting the articles with a glazing solution comprising water 99.9% to about 98% and an edible solute characterized by its ability to lower the freezing point of the solution and to render the resultant glaze highly resistant to cracking and like damage, said solute being by weight .1% to about 2%.

8. In the preservation of flesh foods, the method which comprises refrigerating the articles to a temperature within the sub-zero range, and, before the average temperature of the articles can rise appreciably above 0° F., glazing the articles by subjecting them to an aqueous glazing solution comprising an edible solute characterized by its ability to lower the freezing point of the solution and to render the resultant glaze tenacious and highly resistant to cracking and like damage, said solute consisting of at least one material of the following group: sucrose, dextrose, sodium chloride, sodium carbonate, sodium acid carbonate, di-sodium phosphate, tri-sodium phosphate, sodium acid phosphate and sodium sulphate.

9. In the preservation of flesh foods, the method which comprises refrigerating the articles to a temperature within the sub-zero range, and, before the average temperature of the articles can rise appreciably above 0° F., glazing the articles by subjecting them to a glazing solution comprising water 99.9% to about 98% and an edible solute characterized by its ability to lower the freezing point of the solution and to render the resultant glaze tenacious and highly resistant to cracking and like damage, said solute being by weight .1% to about 2% and composed of at least one material of the following group: sucrose, dextrose, sodium chloride, sodium carbonate, sodium acid carbonate, di-sodium phosphate, tri-sodium phosphate, sodium acid phosphate and sodium sulphate.

10. The method of preserving comestibles, such as fish and like articles, which includes freezing the articles to a temperature lying in a range between about +5° F. and −50° F., and while so frozen applying to the articles a protective ice-glaze containing a fraction to 1% of sodium chloride.

11. The method of preserving comestibles, such as fish and like articles, which includes freezing the articles to a temperature lying in a range between about +5° F. and −50° F., and while so frozen applying to the articles a protective ice-glaze containing a fraction to 1% of sucrose.

CARL A. HEDREEN.
HARRY R. BEARD.